United States Patent
Sun

(10) Patent No.: US 10,445,649 B2
(45) Date of Patent: Oct. 15, 2019

(54) NETWORK APPLICATION PARTICIPATION CONTROL SYSTEM

(71) Applicant: Tencent Technology (Shenzhen) Company Limited, Shenzhen (CN)

(72) Inventor: Mingxing Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1014 days.

(21) Appl. No.: 14/692,524

(22) Filed: Apr. 21, 2015

(65) Prior Publication Data

US 2015/0227850 A1  Aug. 13, 2015

Related U.S. Application Data

(63) Continuation of application No. PCT/CN2014/084296, filed on Aug. 13, 2014.

(30) Foreign Application Priority Data

Dec. 16, 2013  (CN) .......................... 2013 1 0695007

(51) Int. Cl.
G06N 7/00 (2006.01)
G06Q 30/02 (2012.01)
H04L 29/08 (2006.01)

(52) U.S. Cl.
CPC ............ *G06N 7/005* (2013.01); *G06Q 30/02* (2013.01); *H04L 67/22* (2013.01)

(58) Field of Classification Search
None
See application file for complete search history.

(56) References Cited

U.S. PATENT DOCUMENTS

2006/0094506 A1* 5/2006 Tarter ................. G06Q 10/00 463/42
2009/0275410 A1* 11/2009 Kisenwether ......... G06Q 10/00 463/42
2012/0058815 A1  3/2012 Ivanov
(Continued)

FOREIGN PATENT DOCUMENTS

CN  101553289 A  10/2009
CN  101593386 A  12/2009
(Continued)

OTHER PUBLICATIONS

International Search Report and Written Opinion dated Nov. 15, 2014 for International Application No. PCT/CN2014/084296, 8 pages.

*Primary Examiner* — Li Wu Chang
(74) *Attorney, Agent, or Firm* — Brinks Gilson & Lione

(57) ABSTRACT

A data processing method and a device applicable to network application are provided. The data processing method includes: receiving a network application participating operation; executing network application based on the network application participating operation; determining whether the network application wins a network application participating result draw; and adjusting the probabilities of obtaining the remaining application participating results if the network application wins the network application participating result draw. The present disclosure can correlate network applications in network application.

12 Claims, 6 Drawing Sheets

(56) References Cited

U.S. PATENT DOCUMENTS

2012/0158509 A1* 6/2012 Zivkovic ............ G06Q 30/0241
  705/14.58
2012/0289322 A1* 11/2012 Causley .............. G07F 17/3244
  463/26
2013/0310155 A1 11/2013 Fujisawa et al.

FOREIGN PATENT DOCUMENTS

| CN | 102084393 A | 6/2011 |
| KR | 20040048286 | 6/2004 |
| TW | M464770 U | 11/2013 |

* cited by examiner

NETWORK APPLICATION PARTICIPATION CONTROL SYSTEM

CROSS-REFERENCE TO RELATED APPLICATIONS

This application is a continuation of International Application No. PCT/CN2014/084296, filed on Aug. 13, 2014, which claims priority to Chinese Patent Application No. 201310695007.5, filed on Dec. 16, 2013, both of which are hereby incorporated by reference in their entireties.

FIELD

The present disclosure relates to the data processing field, and more specifically, to a data processing method and a device applicable to network application.

BACKGROUND

Most marketing and sales campaigns in the current games market focus on giving away network application participating results for network applications, and the core of network applications is probabilistic algorithm.

Currently the fixed probability network application is adopted in the majority of network application events, and the prop probability never changes throughout the events. A player accesses the network application, wins a network application participating result draw, and leaves. The same probability of network application participating result applies when the player accesses the network application next time, and there is no difference between winning for one time and winning for one hundred times. Details are provided below:

Suppose the network application participating results are network application participating result 1, network application participating result 2, network application participating result 3, network application participating result 4 and network application participating result 5. Take lottery draw for example. Network application participating results are prop 1, prop 2, prop 3, prop 4, prop 5 and ultimate prop, respectively, and the corresponding probabilities are 10%, 20%, 30%, 20%, %18, and %2, respectively.

The first network application: The application ends after the network application participating result 4 is obtained.

The second network application: The application ends after the network application participating result 3 is obtained.

The third network application: The application ends after the network application participating result 3 is obtained.

The fourth network application: The application ends after the network application participating result 2 is obtained.

The traditional probabilistic algorithm of network application is inflexible. The network application participating result props of each game are stored in the network application participating result database as fixed probability values. When a player accesses the game page and participates in the network application, the background will automatically generate a random number in the range of 1 to 100, and the corresponding prop will be won when the number falls in the probability rate of this prop. The algorithm is rather monotonous.

No effective solution has been proposed to fix the problem of monotonous probabilistic algorithm of network application in the current technology.

SUMMARY

The embodiment of the present disclosure aims to provide a data processing method and device applicable to network application and solve the problem of monotonous probabilistic algorithm of network application in the current technology.

In a first aspect, a data processing method applicable to network application is provided according to one aspect in the embodiment of the present disclosure. This method includes: receiving network application participating operation; executing network application based on the network application participating operation; determining whether the network application wins the network application participating result; and adjusting the obtaining probabilities of the remaining application participating results if the network application wins the network application participating result.

In a second aspect, a data processing device applicable to network application is designed according to another aspect in the embodiment of the present disclosure. This device includes a processor and a non-transitory storage medium accessible to the processor. The non-transitory storage medium is configured to store units including: a receiving unit, an execution unit, a determining unit, and an adjustment unit. The receiving unit is configured to receive the network application participating operation; execution unit is configured to execute network application based on the network application participating operation. The determining unit is configured to determine whether the network application wins the network application participating result. The adjustment unit is configured to adjust the obtaining probabilities of remaining application participating results when the network application wins the network application participating result.

In a third aspect, a data processing device includes a processor and a non-transitory storage medium accessible to the processor. The non-transitory storage medium is configured to store a set of instructions that direct the processor to perform acts including: receiving a network application participating operation; executing the participation of network application based on the network application participating operation; determining whether the network application wins a network application participating result draw; and adjusting the probabilities of obtaining the remaining network application participating results when the network application wins the network application participating result draw.

The embodiments of the present disclosure fix the problem of monotonous probabilistic algorithm of network application in the current technology, and further achieve the effect of correlating network application in network application.

BRIEF DESCRIPTION OF THE DRAWINGS

The attached drawings as a part of the application further illustrate the present disclosure. The illustrative embodiments of the present disclosure and corresponding description provided herein are only for the purpose of explanation, and are not intended to limit the present disclosure. In the attached drawings.

DETAILED DESCRIPTION OF THE DRAWINGS

Figure 1:
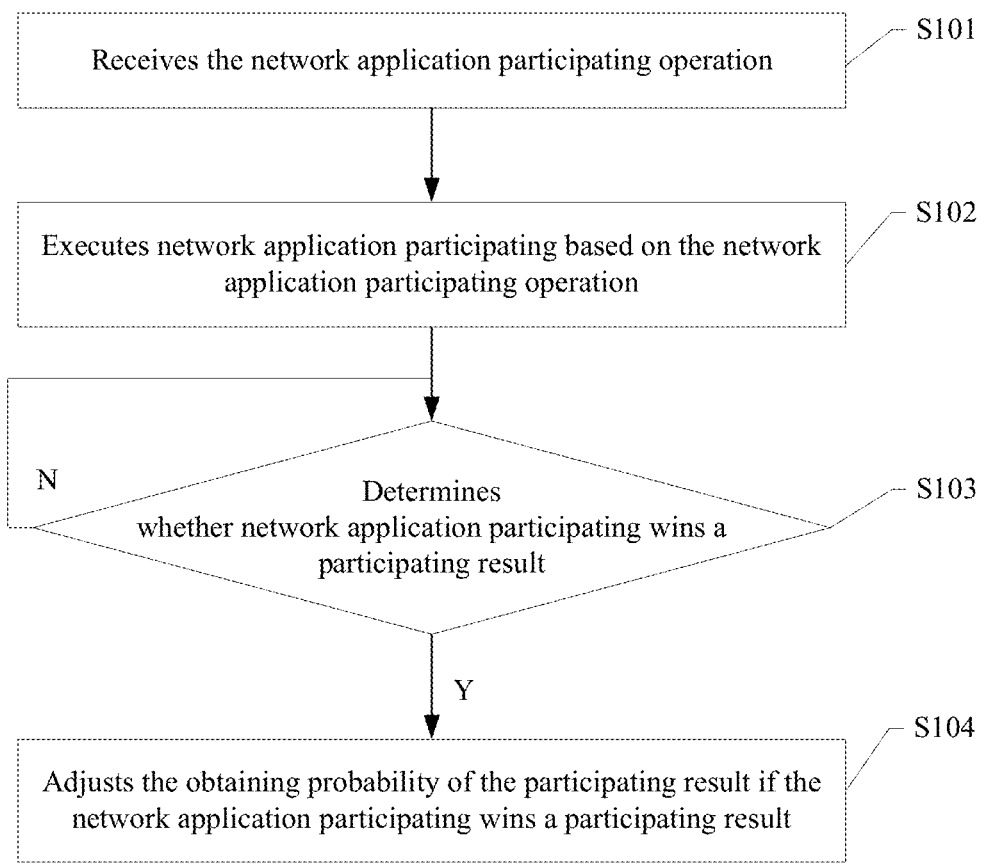
FIG. 1 provides an example flowchart of the data processing method used for network application according to embodiments of the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "includes," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

Note that the embodiments in the application and characteristics in those embodiments may be combined provided that no conflict is caused. The present disclosure is detailed below by referring to the attached drawings and in conjunction with the embodiments.

To help those skilled in the art to better understand the solution of the present disclosure, the technical solutions provided in the embodiments of the present disclosure are elaborately and comprehensively described below in conjunction with the attached drawings of these embodiments. Obviously, the described embodiments are only some embodiments but not all embodiments of the present disclosure. Based on the embodiments of the present disclosure, all the other embodiments obtained by those with ordinary skilled in the art without creative work shall be within the protection scope of the present disclosure.

It is notable that the terms such as "the first" and "the second" used in the Specification, Claims, and above attached drawings of the present disclosure aim to distinguish similar objects, but unnecessarily describe a specific order or precedence level. It should be understood that such used data may be interchanged in a proper situation so that the embodiment of the present disclosure described herein may be implemented in an order other than those illustrated or represented herein. Besides, the words such as "comprise" and "have" and any other forms of these words are intended to cover non-exclusive inclusion. For example, processes, methods, systems, products or devices comprising a series of steps or units are not necessarily limited to those steps or units that are clearly listed, but can include other steps or units that are not clearly listed but are inherent to these processes, methods, systems, products or devices.

The embodiment of the present disclosure provides a data processing method applicable to network application.

FIG. 1 provides the flowchart of the data processing method used for network application according to embodiments of the present disclosure. For example, the network application may be a network-based lottery draw. All the network applications in the embodiments of the present disclosure can refer to lottery draws over a network. As shown in the figure, this data processing method used for network application includes the following steps:

Step S101: Receiving network application participating operation. For example, a data processing device may receive network application participating operation in a network application system. The network application participating operation may have different operation forms in various network application forms. However, all the network application participating operations may trigger the start of the network application flow, and ask the network application system to start network application work. A wide variety of network application forms exist, for example, rolling network application at an evening party, "Big Wheel" network application in games, or "Egg Breaking" network application in games. All the network application forms require users to trigger start of network application work, and the network application system receives users' signals for requiring network application at the same time. The network application system may include a data processing device, which may be a server or a client.

Step S102: Executing network application based on the network application participating operation. After receiving the network application participating operation, the network application system starts the network application participating operation. Depending on the network application system, one or multiple times of network application may be provided for users. In the case that the user can perform the network application for multiple times, to make the network application more interesting and to increase the winning probability for the user, the probabilities of obtaining other network application participating results may be adjusted after the user wins a network application participating result draw.

After receiving the network application participating operation from the user, the network application system sends a random number to the user, and determines whether the user wins the network application participating result draw depending on whether the random number received by the user meets the winning criteria set in the system.

Step S103: Determining whether the network application wins the network application participating result. The network application system sets a basic probability of obtaining each network application participating result, and the probability of obtaining each network application participating result may be the same or different from each other. The network application system sets a corresponding obtaining probability depending on the quantity of individual network application participating results. For instance, the system sets a higher obtaining probability for common props in a game, but sets a lower obtaining probability for ultimate prop in the game.

Step S104: Adjusting the probability of obtaining the remaining application participating results if the network application wins an application participating result draw. After learning that the user wins the network application participating result draw, the network application system deducts the corresponding probability of the network application participating result won this time, and adjusts the probabilities of obtaining the remaining application participating results. To control the quantities of released common props and ultimate props in the aforesaid example, the probabilities of obtaining the remaining application participating results may be adjusted according to the set basic obtaining probability.

The above method may be configured to increase the probabilities of obtaining the remaining application participating results after a network application participating result draw is won for the first time. In this way, the probabilities of obtaining the remaining application participating results may be increased each time the user wins a network application participating result draw.

Figure 2:
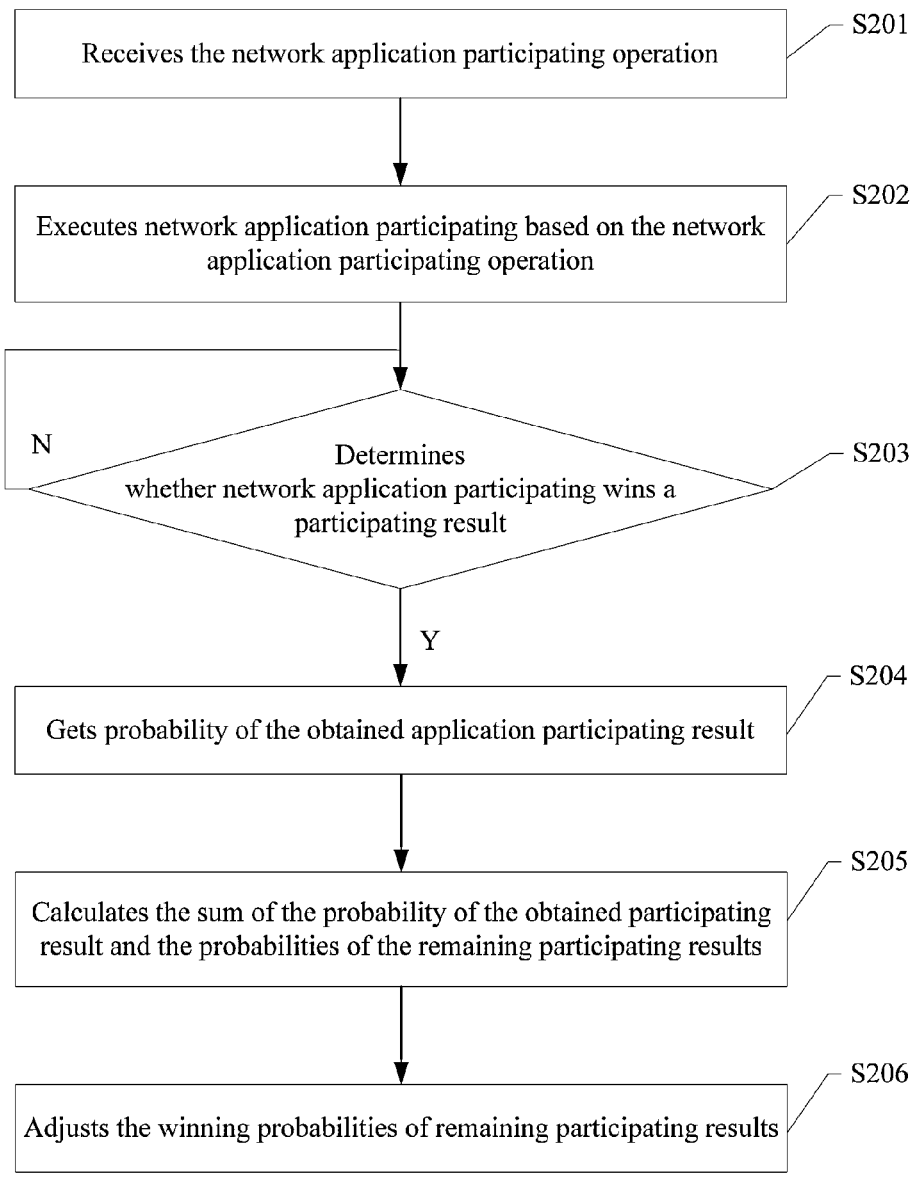
FIG. 2 provides the flowchart of the data processing method used for network application according to embodiments of the present disclosure.

FIG. 2 provides the flowchart of the data processing method used for network application according to embodiments of the present disclosure. As shown in the figure, this data processing method used for network application includes the following steps:

Step S201: Receiving network application participating operation. The network application participating operation may have different operation forms in various network application forms, but all the network application participating operations can trigger the start of the network application flow, and ask the network application system to start network application work. A wide variety of network application forms exist, for example, rolling network application at an evening party, "Big Wheel" network application in games, or "Egg Breaking" network application in games. All the network application forms require users to trigger the start of network application work, and, at the same time, the network application system receives the user's signal of network application.

Step S202: Executing network application based on the network application participating operation. After receiving the network application participating operation, the network application system starts the network application participating operation. Depending on the network application system, the number of times that the network application may be provided for users may be one or more. In the case that the user can perform the network application for several times, to make the network application more interesting and to increase the winning probability of the user, the probabilities of obtaining other network application participating results may be adjusted after the user wins a network application participating result draw.

After receiving the network application participating operation of the user, the network application system sends a random number to the user, and determines whether the user wins the network application participating result draw depending on whether the random number received by the user meets the winning criteria set in the system.

Step S203: Determining whether the network application wins the network application participating result draw. The network application system sets a basic winning probability for each network application participating result, and the probability of winning each network application participating result may be the same or different from each other. The network application system sets a corresponding obtaining probability depending on the quantity of individual network application participating results. For instance, the system sets a higher obtaining probability for common props in a game, but sets a lower obtaining probability for ultimate prop in the game.

Step S204: Acquiring the probability of the obtained application participating result. The network application system sets the corresponding obtaining probability for each network application participating result, and can store the corresponding obtaining probability of each network application participating result in a winning probability table. After confirming that the user wins a network application participating result draw, the system finds the corresponding winning probability of the won network application participating result in the winning probability table. After the user wins the network application participating result draw, the user's winning information is stored in the database as a record. During the whole network application activity with one record for one user, the number of turns of the network application and the serial number of the won network application participating result are recorded for the user so that the system can count the probabilities of the remaining application participating results.

Step S205: Calculating the sum of the probability of the obtained application participating result and the probabilities of the remaining application participating results. After acquiring the probability of the obtained application participating result, the system determines the sum of the probability of the obtained application participating result and the probabilities of the remaining network application participating results. The probability of the won network application participating result and the probabilities of the remaining network application participating results may be set according to the requirements of the network application activity. For example, if the obtaining probability of all the network application participating results is 50%, then the probability of failing to win any network application participating result is 50%. If the winning probability is 100%, then the sum of the probability of the obtained application participating result and the probabilities of the remaining network application participating results is 100%.

Step S206: Adjusting the probabilities of obtaining the remaining application participating results, wherein the adjusted probabilities of obtaining the remaining application participating results are the sum of the probability of the obtained application participating result and the probabilities of the remaining application participating results before the adjustment.

After a network application participating result is won, the probabilities of obtaining the remaining application participating results are adjusted and increased. In this way, two network application processes may be correlated. In the process of adjusting the probabilities of obtaining the remaining application participating results, the system must ensure that the probabilistic cardinal number is kept unchanged. In other words, the adjusted probabilities of obtaining the remaining application participating results are the sum of the probability of the obtained application participating result and the probabilities of the remaining application participating results before the adjustment. It can also be understood that the corresponding probability of the won network application participating result is apportioned among the probabilities of obtaining the remaining application participating results.

Preferably, to conveniently allocate the probability of obtaining each network application participating result and in consideration of the requirements of the activity, the sum of the probability of the obtained application participating result and the probabilities of the remaining application participating results may be set to 100%, and the probability of the obtained application participating result is apportioned among the probabilities of obtaining the remaining application participating results.

Since the sum of network application participating results set in the network application system is the same, after a network application participating result is won, the sum of winning probabilities for the prize pool is surely kept at 100% while the obtaining probability is increased. In other words, the probability of the obtained application participating result is apportioned among the probabilities of obtaining the remaining network application participating results. In the apportioning process, the basic obtaining probability corresponding to the remaining network application participating result is used as the apportioning percentage, and the obtaining probability corresponding to the won network application participating result is apportioned among the remaining network application participating results according to the percentage.

In the process of apportioning the probability corresponding to the won network application participating result, since the apportioning is made according to the basic obtaining probability corresponding to each network application participating result and the probability corresponding to the won network application participating result is removed, so there is a remaining part of probability after apportioning according to the percentage of obtaining probability. The network application participating results include common network application participating results and ultimate props. In consideration of financial benefits, the remaining part of probability is added to the largest basic obtaining probability.

The probabilities of winning props in a game are taken as an example below to describe the obtaining probabilities of network application participating results:

As described in Table 1, the obtaining probabilities of prop 2, prop 3, prop 4, prop 5 and ultimate prop are adjusted when prop 1 is won in the first draw; the obtaining probabilities of prop 3, prop 4, prop 5 and ultimate prop are adjusted when prop 2 is won in the second draw.

|  | Prop 1 | Prop 2 | Prop 3 | Prop 4 | Prop 5 | Ultimate prop | Total probability |
| --- | --- | --- | --- | --- | --- | --- | --- |
| Basic probability | 5% | 15% | 30% | 25% | 20% | 5% | 100% |
| The first time of network application | 5% * 5 | 15% * 5 | 30% * 5 | 25% * 5 | 20% * 5 | 5% * 5 |  |
| Algorithm | * | 15% + 0.75% | 30% + 1.5% + 0.25% | 25% + 1.25% | 20% + 1% | 5% + 0.25% | 100% |
| Floating probability | * | 15.75% | 31.75% | 26.25% | 21% | 5.25% | 100% |
| The second draw | * | 15.75% * 15.75 | 31.75% * 15.75 | 26.25% * 15.75 | 21% * 15.75 | 5.25% * 15.75 |  |
| Algorithm | * | * | 31.75% + 5.00 0625% + 2.480625% | 30.384375% | 24.3075% | 6.076875% | 100% |
| Floating probability | * | * | 39.23125% | 30.384375% | 24.3075% | 6.076875% | 100% |

The basic obtaining probabilities of prop 1, prop 2, prop 3, prop 4, prop 5 and ultimate prop are 5%, 15%, 30%, 25%, 20%, and 5%, respectively.

Suppose prop 1 is won in the first draw. Then the winning probabilities of prop 1, prop 2, prop 3, prop 4, prop 5 and ultimate prop in the first draw are 5%*5, 15%*5, 30%*5, 25%*5, 20%*5 and 5%*5, respectively.

After prop 1 is won, the corresponding winning probability 5% of prop 1 is apportioned among the probabilities of remaining prizes, and the apportioning proportion of each prize is the same as the basic winning probability. Then, the apportioned probabilities of prop 2, prop 3, prop 4, prop 5 and ultimate prop are 0.75%, 1.5%, 1.25%, 1% and 0.25% respectively. The probability of 0.25% remains after 5% is apportioned according to the basic winning probabilities. The remaining probability 0.25% is added to the prize which has the highest basic winning probability. Then, the winning probability of prop 2 is 30%+1.5%+0.25%=31.75%.

After the winning probability 5% is apportioned among the probabilities of remaining prizes, the probabilities of prop 2, prop 3, prop 4, prop 5 and ultimate prop change from 15%, 30%, 25%, 20%, and 5% to 15.75%, 31.75%, 26.25%, 21%, and 5.25% respectively. The sum of the changed probabilities of remaining props is 100%.

Suppose prop 2 is won at the second time of network application. Then the winning probabilities of remaining rewards are 15.75%*15.75, 31.75%*15.75, 26.25%*15.75, 21%*15.75, and 5.25%*15.75 in turn.

Similarly, the winning probability of prop 2 is apportioned among remaining prizes after prop 2 is won. After the apportioning process, the probabilities of prop 2, prop 3, prop 4, prop 5, and ultimate prop are respectively 39.23125%, 30.384375%, 24.3075%, and 6.076875%.

The probability apportioning method after other rewards are won is the same as the apportioning method after prop 1 and prop 2 are won. Details are omitted here.

Probability apportioning not only maintains the winning probability of 100% in the prize pool, but also increases the winning probabilities of other props after the user wins a prop. Thus, the system boosts the user's enthusiasm and dynamically changes winning probabilities.

Preferably, to conveniently calculate the obtaining probabilities of remaining application participating results, the probability of the obtained application participating result and obtaining probabilities of remaining application participating results need to meet the following formula: $(K+K*T)+(J+J*T+T*T)+(P+P*T)+ \ldots +(n+n*T)=100\%$, wherein T indicates the probability of the obtained application participating result, K indicates the probability of the first network application participating result in remaining network application participating results, J indicates the probability of the second network participating result in remaining network application participating results, P indicates the probability of the third network application participating result in remaining network application participating results, and n indicates the probability of network application participating result n in remaining network application participating results.

To ensure that the quantity of the won network application participating result is basically consistent with the preset quantity after the obtaining probabilities change, the remaining probability after apportioning is added to the preset network application participating result with the highest basic obtaining probability. In this way, the winning probability of ultimate prop is basically the same as the preset value, and the player's winning probability is also increased without breaking the network application participating result quantity rule set by the game provider. Therefore, J in the above formula may be the probability corresponding to the network application participating result with the largest basic obtaining probability.

Figure 3:
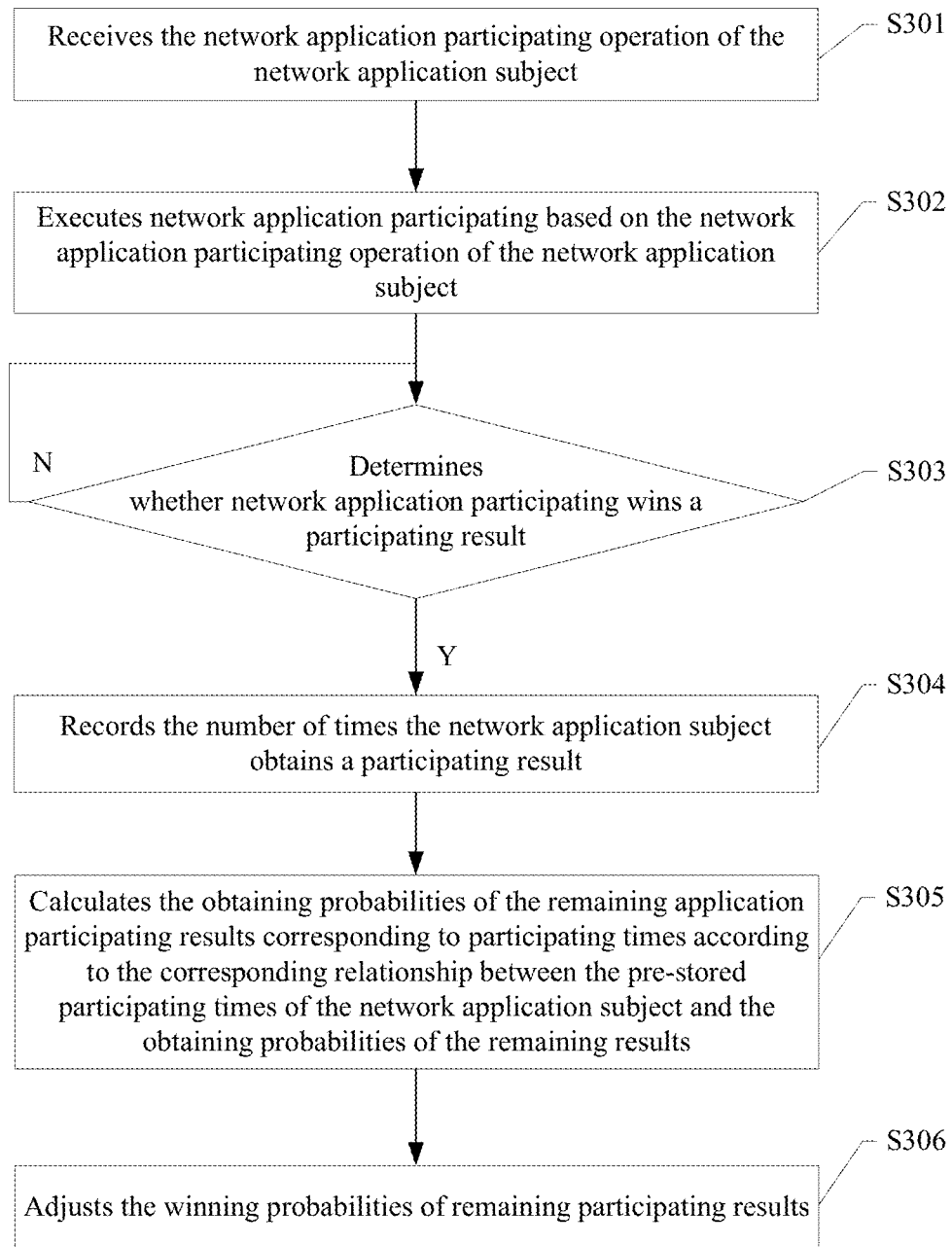
FIG. 3 provides the flowchart of the data processing method used for network application according to embodiments of the present disclosure.

FIG. 3 provides the flowchart of the data processing method used for network application according to embodiments of the present disclosure. As shown in the figure, this data processing method used for network application includes the following steps:

Step S301: Receiving network application participating operation of the network application subject. The network application participating operation may have different operation forms in various network application forms, but all the network application participating operations can trigger start of the network application flow, and ask the network application system to start network application work. A wide variety of network application forms exist, for example, rolling network application at an evening party, "Big Wheel" network application in games, or "Egg Breaking" network application in games. All the network application forms require users to trigger start of network application work, and the network application system receives users' signals for requiring network application at the same time.

Receiving network application participating operation of the network application subject can receive the user's network application participating operation and trigger the network application system to implement network application.

Step S302: Executing network application based on the network application participating operation of the network application subject. After receiving the network application participating operation, the network application system starts the network application participating operation. Depending on the network application system, the number of times when network application may be provided for users may be one or more. After receiving the network application participating operation of the user, the network application system automatically generates a random number in the range of 1 to 100, determines the network application participating result whose probability percentage covers the generated number, and determines the prize for the user.

The number of times of user network application may be determined by the settings of the network application system and may be one or more. At the second time of user network application, the obtaining probability of each network application participating result may be changed to make the user network application more interesting.

Step S303: Determining whether the network application subject wins a network application participating result draw. The system determines whether the random number generated after the user triggers the start of the network application participating operation falls in the probability percentage of a network application participating result. If the number fails in the probability percentage set by the network application system, the system will determine the corresponding network application participating result won by the user; otherwise the system will determine that the user doesn't win a network application participating result draw in this round.

Step S304: Adjusting the obtaining probabilities of the remaining application participating results corresponding to the network application subject if the network application wins the network application participating result, wherein adjusting the obtaining probabilities of the remaining application participating results corresponding to the network application subject includes the following steps:

Step S3041: Recording the number of times of the network application for the network application subject. The system records the number of rounds for the network application and the serial number of a won network application participating result for the network application subject in the record table, and stores this table in a database. Each network application subject corresponds to one record throughout the network application activity, and the network application subject may be a player.

When the player participates in the network application next time, the network application system will calculate the obtaining probability of each network application participating result according to the number of rounds of the network application and the won network application participating result in this player's network application record.

Step S3042: Calculating the obtaining probabilities of the remaining application participating results corresponding to the number of times of the network application according to the corresponding relationship between the pre-stored number of times of the network application for the network application subject and the obtaining probabilities of the remaining application participating results.

Each time the player wins a network application participating result draw, the probability value of the network application prize will be apportioned among the remaining network application participating results according to their respective percentages out of 100%. For example, the original basic probability value of ultimate prop is 5%, and it will get a percentage value of 0.25% from prop 1 by its probability of 5% after prop 1 is won in the first round; when the player participates in the second round of network application, the percentage value of the ultimate prop is 5.25%, and the probability percentage of the won prop is added to the remaining prop which has the highest probability in the next round. The cardinal number of the prize pool is restored to 100% again, and the probability increase level of the ultimate prop is not high due to restriction of the basic probability value (5%). The overall probability percentage of each prop in all the prizes set will not change too much.

Step S3043: Adjusting the obtaining probabilities of the remaining application participating results for the network application subject according to the calculated obtaining probabilities of the remaining application participating results.

Since each network application subject has a different number of times of network application, the network application subject will have different obtaining probabilities for each time of network application. As a result, when calculating the current obtaining probabilities of the remaining application participating results for each network application subject, the system needs to calculate the obtaining probabilities of currently remaining application participating results for the network application subject according to the current round of user network application and the won network application participating results stored in the database.

Figure 4:
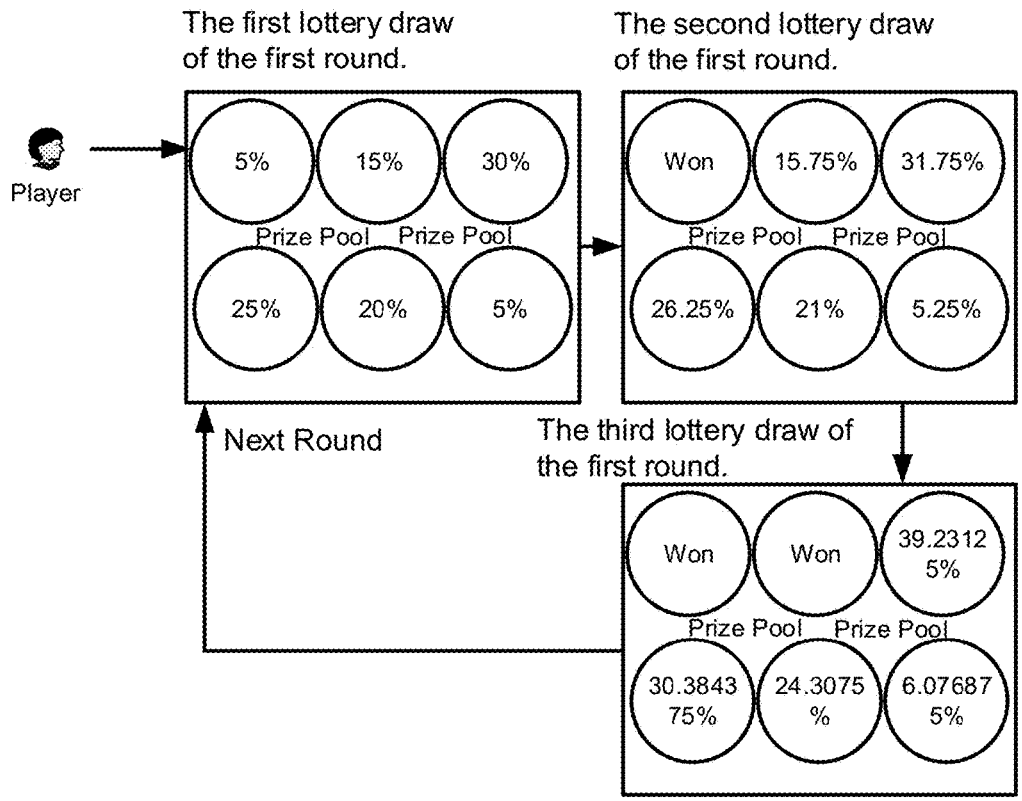
FIG. 4 shows the probability change in each round of network application joined by the player in the embodiments of the present disclosure.

FIG. 4 shows the network application probabilities in each round of network application for a player. The player may use a client device such as a smart phone or other computing device to access a computer server through a computer network.

As shown in the figure, when the player is having the first time of network application in the first round, the sum of probabilities of all the network application participating results is 100%, and the winning probability of each network application participating result is the basic obtaining probability corresponding to this network application participating result; six network application participating results are set in this round, and their corresponding winning probabilities are 5%, 15%, 30%, 25%, 20%, and 5%, respectively.

If the first network application result with an obtaining probability of 5% is won in the first time of network application of the first round, the corresponding obtaining probabilities of the remaining network application participating results change to 15.75%, 31.75%, 26.25%, 21%, and 5.25% respectively in the second time of network application of the first round. Although the corresponding obtaining probability of each network application participating result changes, the overall obtaining probability of the whole prize pool is still kept at 100%.

Suppose the network application participating result corresponding to the probability of 15.75% is won in the second time of network application of the third round, then in the third time of network application of the first round, the obtaining probabilities corresponding to the remaining network application participating results change to 39.23125%, 30.384375%, 24.3075%, and 6.076875% accordingly.

The next round of network application starts after the first round of network application ends. The basic obtaining probabilities are used as the obtaining probabilities for the user in the next round of network application.

The embodiments of the present disclosure also provide a data processing device used for network application. The data processing device may be any computing device including at least one of a server and a client. For example, the data processing device may include any computing server including a processor and a non-transitory storage medium accessible to the processor.

The data processing method used for network application in the embodiment of the present disclosure may be executed using the data processing device used for network application provided in the embodiment of the present disclosure. The data processing device used for network application in the embodiment of the present disclosure can also be configured to execute the data processing method used for network application provided in the embodiment of the present disclosure. All or part of the data processing method may be implemented in a server while the rest of the method may be implemented in a client communicating with the server.

Figure 5:
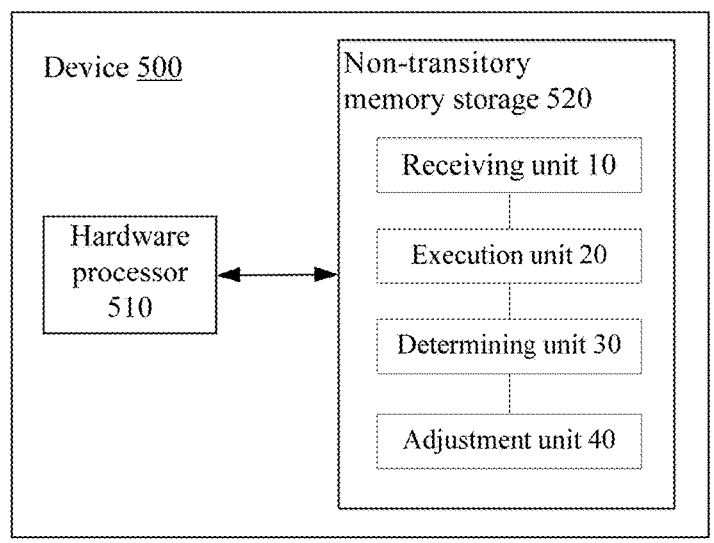
FIG. 5 shows the data processing device used for network application according to embodiments of the present disclosure.

FIG. 5 shows a data processing device 500 used for network application according to embodiments of the present disclosure. As shown in the figure, this data processing device used for network application includes a processor 510 and a non-transitory storage medium 520. The non-transitory storage medium 520 is configured to store units including: a receiving unit 10, an execution unit 20, a determining unit 30, and an adjustment unit 40.

The receiving unit 10 is configured to receive the network application participating operation. The network application participating operation may have different operation forms in various network application forms, but all the network application participating operations can trigger start of the network application flow, and ask the network application system to start network application work. A wide variety of network application forms exist, for example, rolling network application at an evening party, "Big Wheel" network application in games, or "Egg Breaking" network application in games. All the network application forms require users to trigger start of network application work, and the network application system receives users' signals for requiring network application at the same time.

The receiving unit 10 can receive the network application participating operation of a network application subject, wherein the network application subject is preferably a network application activity player. The receiving unit 10 can receive the network application participating operation of the activity player. The network application participating operation of the activity player notifies the network application system to start network application work.

The execution unit 20 is configured to execute network application based on the network application participating operation. After receiving the network application participating operation, the network application system starts the network application participating operation. Depending on the network application system, the number of times when network application may be provided for users may be one or more. In the case that the user can have multiple times of network application, to make the network application more interesting and to increase the winning probability for the user, the obtaining probabilities of other network application participating results may be adjusted after the user wins a network application participating result draw.

After receiving the network application participating operation of the user, the network application system sends a random number to the user, and determines whether the user wins the network application participating result depending on whether the random number received by the user meets the winning criteria set in the system.

The determining unit 30 is configured to determine whether the network application wins the network application participating result. The network application system sets a basic obtaining probability for each network application participating result, and the obtaining probability for each network application participating result may be the same or different from each other. The network application system sets a corresponding obtaining probability according to the quantity of individual network application participating results. For instance, the system sets a higher obtaining probability for common props in a game, but sets a lower obtaining probability for ultimate prop in the game.

The system generates a random number during the network application, and the network application participating result whose probability percentage covers the preset random number will be won. The determining unit 30 can determine whether the current network application wins a network application participating result according to the basic network application probability set in the network application system and the generated random number.

The adjustment unit 40 is configured to adjust the obtaining probabilities of remaining network application participating results when the network application wins a network application participating result. After learning that the user wins the network application participating result, the network application system deducts the corresponding probability of the network application participating result won this time, and adjusts the obtaining probabilities of the remaining application participating results. To control the quantities of released common props and ultimate props in the aforesaid example, the obtaining probabilities of the remaining application participating results may be adjusted according to the set basic obtaining probability.

The above data processing device used for network application may be configured to increase the obtaining probabilities of the remaining application participating results after a network application participating result is won for the first time. In this way, the obtaining probabilities of the remaining application participating results may be increased after the user wins a network application participating result each time.

Figure 6:
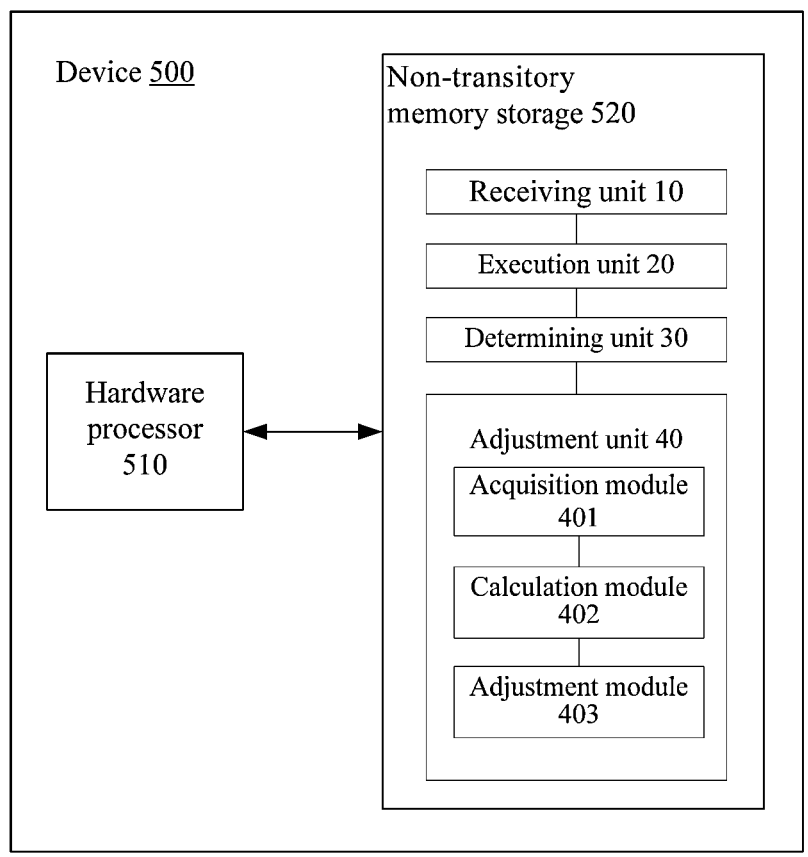
FIG. 6 shows the data processing device used for network application according to embodiments of the present disclosure.

FIG. 6 shows an example data processing device 500 according to embodiments of the present disclosure. As shown in the figure, this data processing device includes a receiving unit 10, an execution unit 20, a determining unit 30, and an adjustment unit 40, wherein the adjustment unit 40 further includes an acquisition module 401, a calculation module 402, and an adjustment module 403.

The receiving unit 10 is configured to receive the network application participating operation. The network application participating operation may have different operation forms in various network application forms, but all the network application participating operations can trigger start of the network application flow, and ask the network application system to start network application work. A wide variety of network application forms exist, for example, rolling network application at an evening party, "Big Wheel" network application in games, or "Egg Breaking" network application in games. All the network application forms require users to trigger start of network application work, and the network application system receives users' signals for requiring network application at the same time.

Execution unit 20 is configured to execute network application based on the network application participating operation. After receiving the network application participating operation, the network application system starts the network application participating operation. Depending on the network application system, the number of times when network application may be provided for users may be one or more. In the case that the user can have multiple times of network application, to make the network application more interesting and to increase the winning probability of the user, the obtaining probabilities of other network application participating results may be adjusted after the user wins a network application participating result draw.

After receiving the network application participating operation of the user, the network application system sends a random number to the user, and determines whether the user wins the network application participating result depending on whether the random number received by the user meets the winning criteria set in the system.

The determining unit 30 is configured to determine whether the network application wins the network application participating result. The network application system sets a basic obtaining probability for each network application participating result, and the obtaining probability for each network application participating result may be the same or different from each other. The network application system sets a corresponding obtaining probability depending on the quantity of each network application participating result. For instance, the system sets a higher obtaining probability for common prop in a game, but sets a lower obtaining probability for ultimate prop in the game.

The system generates a random number during the network application, and a network application participating result is won in the draw if it falls on the preset random number. The determining unit 30 can determine whether the current network application wins a network application participating result according to the basic network application probability set in the network application system and the generated random number.

The adjustment unit 40 is configured to adjust the obtaining probabilities of remaining network application participating results when the network application wins a network application participating result draw. After learning that the user wins the network application participating result draw, the network application system deducts the corresponding probability of the network application participating result won this time, and adjusts the obtaining probabilities of the remaining application participating results. To control the quantities of released common props and ultimate props in the aforesaid example, the obtaining probabilities of the remaining application participating results may be adjusted according to the set basic obtaining probability.

Here, the adjustment unit 40 also includes an acquisition module 401, a calculation module 402, and an adjustment module 403. The obtaining probabilities of the remaining application participating results may be adjusted through acquisition module 401, calculation module 402, and adjustment module 403.

The acquisition module 401 is configured to acquire the probability of the obtained application participating result. The network application system sets the corresponding obtaining probability of each network application participating result, and can store the corresponding obtaining probability of each network application participating result in the winning probability table. After confirming that the user wins the network application participating result, the system finds the corresponding winning probability of the won network application participating result in the winning probability table. After the user wins the network application participating result draw, the user winning information is stored in the database as a record. During the whole network application activity, one user corresponds to one record, the number of rounds of network application and the serial number of the won network application participating result are recorded for the user so that the system can make a statistics of the probabilities of the remaining application participating results.

The calculation module 402 is configured to calculate the sum of the probability of the obtained application participating result and the probabilities of remaining application participating results. After acquiring the probability of the obtained application participating result, the system determines the sum of the probability of the obtained application participating result and the probabilities of the remaining network application participating results. The probability of the won network application participating result and the probabilities of the remaining network application participating results may be set according to the requirements of the network application activity. For example, if the obtaining probability of all the network application participating results is 50%, then the probability of not winning a network application participating result draw is 50%; If the winning probability is 100%, then the sum of the probability of the obtained application participating result and the probabilities of the remaining network application participating results is 100%.

The adjustment module 403 is configured to adjust the obtaining probabilities of the remaining application participating results, wherein the adjusted obtaining probabilities of the remaining application participating results are the sum of the probability of the obtained application participating result and the probabilities of the remaining application participating results before the adjustment. After a network application participating result is won in the draw, the obtaining probabilities of the remaining application participating results are adjusted and increased. In this way, two network application processes may be correlated. In the process of adjusting the obtaining probabilities of the remaining application participating results, the system must ensure that the probabilistic cardinal number is kept unchanged. In other words, the adjusted obtaining probabilities of the remaining application participating results are the sum of the probability of the obtained application participating result and the probabilities of the remaining application participating results before the adjustment. It can also be understood that the corresponding probability of the won network application participating result is apportioned onto the obtaining probabilities of the remaining application participating results.

Preferably, to conveniently allocate the obtaining probability of each network application participating result and in consideration of the requirements of the activity, the sum of the probability of the obtained application participating result and the probabilities of the remaining application participating results may be set to 100%, and the adjustment unit 4 is configured to apportion the probability of the obtained application participating result among the obtaining probabilities of the remaining application participating results.

Since the sum of network application participating results set in the network application system is the same, after a network application participating result is won, the sum of obtaining probabilities of the prize pool is surely kept at 100% while the obtaining probability is increased. In other words, the probability of the obtained application participating result is apportioned among the obtaining probabilities of the remaining network application participating results. In the apportioning process, the corresponding basic obtaining probability of remaining network application participating result is used as the percentage of apportioning, and the corresponding obtaining probability of the won network application participating result is apportioned among the remaining network application participating results according to the percentage.

In the process of apportioning the corresponding probability of the won network application participating result, since the corresponding probability is apportioned according to the corresponding basic obtaining probability of each network application participating result and the corresponding probability of the won network application participating result is removed, partial probability will remain after the apportioning according to the percentage of obtaining probability. The network application participating results include common network application participating results and ultimate props. In consideration of economic benefits, the remaining partial probability is added to the probability with the largest basic obtaining probability.

The probabilities of won props in a game are taken as an example in the following description:

As described in Table 1, the obtaining probabilities of prop 2, prop 3, prop 4, prop 5 and ultimate prop are adjusted when prop 1 is won in the first draw; the obtaining probabilities of prop 3, prop 4, prop 5 and the ultimate prop are adjusted when prop 2 is won in the second draw.

The basic obtaining probabilities of prop 1, prop 2, prop 3, prop 4, prop 5 and the ultimate prop are 5%, 15%, 30%, 25%, 20%, and 5% respectively.

Suppose prop 1 is won in the first network application participating result draw, then the probabilities of winning prop 1, prop 2, prop 3, prop 4, prop 5 and the ultimate prop in the first time of network application are 5%*5, 15%*5, 30%*5, 25%*5, 20%*5 and 5%*5 respectively.

After prop 1 is won, the corresponding obtaining probability 5% of prop 1 is apportioned among the probabilities of the remaining application participating results, and the apportioning proportion of each network application participating result is the same as the basic obtaining probability. Then, the apportioned probabilities of prop 2, prop 3, prop 4, prop 5 and the ultimate prop are 0.75%, 1.5%, 1.25%, 1% and 0.25% respectively. The probability of 0.25% remains after 5% is apportioned according to the basic obtaining probabilities. The remaining probability 0.25% is added to the network application participating result which has the highest basic obtaining probability. Then, the probability of winning prop 2 is 30%+1.5%+0.25%=31.75%.

In comparison to the network application participating result with a smaller basic probability, the network application participating result with a higher basic probability has a lower cost. Therefore, the remaining probability 0.25% is added to the network application participating result which has the highest basic obtaining probability.

After prop 1 is won, the corresponding obtaining probability 5% of prop 1 is apportioned among the probabilities of the remaining application participating results, and the apportioning proportion of each network application participating result is the same as the basic obtaining probability. Then, the apportioned probabilities of prop 2, prop 3, prop 4, prop 5 and the ultimate prop are 0.75%, 1.5%, 1.25%, 1% and 0.25% respectively. There is a remaining probability of 0.25% after 5% is apportioned according to the basic obtaining probabilities. The remaining probability 0.25% is added to the network application participating result which has the highest basic obtaining probability. Then, the probability of obtaining prop 2 is 30%+1.5%+0.25%=31.75%.

After the obtaining probability 5% is apportioned among the probabilities of the remaining application participating results, the probabilities of prop 2, prop 3, prop 4, prop 5 and ultimate prop change from 15%, 30%, 25%, 20%, and 5% to 15.75%, 31.75%, 26.25%, 21%, and 5.25% respectively. The sum of the changed probabilities of the remaining props is 100%.

Suppose prop 2 is won in the second time of network application, then the probabilities of winning the remaining prizes are 15.75%*15.75, 31.75%*15.75, 26.25%*15.75, 21%*15.75, and 5.25%*15.75 respectively.

Similarly, the obtaining probability of prop 2 is apportioned among the remaining network application participating results after prop 2 is won. After the apportioning process, the probabilities of prop 2, prop 3, prop 4, prop 5, and ultimate prop are 39.23125%, 30.384375%, 24.3075%, and 6.076875%, respectively.

The probability apportioning method of won network application participating result after other network application participating results are won is the same as that after prop 1 and prop 2 are won. Details are omitted here.

The probability apportioning not only maintains the winning probability at 100% in the prize pool, but also increases the obtaining probabilities of other props after the user wins a prop. Thus, the system boosts the user's enthusiasm and dynamically changes winning probabilities.

Preferably, to conveniently calculate the obtaining probabilities of the remaining application participating results, the probability of the obtained application participating result and the probabilities of the remaining application participating results need to meet the following formula: $(K+K*T)+(J+J*T+T*T)+(P+P*T)+ \ldots +(n+n*T)=100\%$, wherein T is the probability of the obtained application participating result, K is the probability of the first network application participating result out of the remaining network application participating results, J is the probability of the second network participating result out of the remaining network application participating results, P is the probability of the third network application participating result out of the remaining network application participating results, and n is the probability of network application participating result n out of the remaining network application participating results.

To ensure that the quantity of the won network application participating result is basically consistent with the preset quantity after the obtaining probabilities change, the remaining probability after apportioning is added to the preset network application participating result with the highest basic obtaining probability. In this way, the winning probability of ultimate prop is basically the same as the preset value, and the winning probability is also increased for the player without breaking the network application participating result quantity rule set by the game provider. Therefore, J in the above formula may be the probability corresponding to the network application participating result with the highest basic obtaining probability.

TABLE 1

Basic probabilities, and probabilities of the first time of network application and the second time of network application.

| | Prop 1 | Prop 2 | Prop 3 | Prop 4 | Prop 5 | Ultimate prop | Total probability |
|---|---|---|---|---|---|---|---|
| Basic probability | 5% | 15% | 30% | 25% | 20% | 5% | 100% |
| The first time of network application | 5% * 5 | 15% * 5 | 30% * 5 | 25% * 5 | 20% * 5 | 5% * 5 | |
| Algorithm | * | 15% + 0.75% | 30% + 1.5% + 0.25% | 25% + 1.25% | 20% + 1% | 5% + 0.25% | 100% |
| Floating probability | * | 15.75% | 31.75% | 26.25% | 21% | 5.25% | 100% |
| The second lottery draw | * | 15.75% * 15.75 | 31.75% * 15.75 | 26.25% * 15.75 | 21% * 15.75 | 5.25% * 15.75 | |
| Algorithm | * | * | 31.75% + 5.000625% + 2.480625% | 30.384375% | 24.3075% | 6.076875% | 100% |
| Floating probability | * | * | 39.23125% | 30.384375% | 24.3075% | 6.076875% | 100% |

Figure 7:
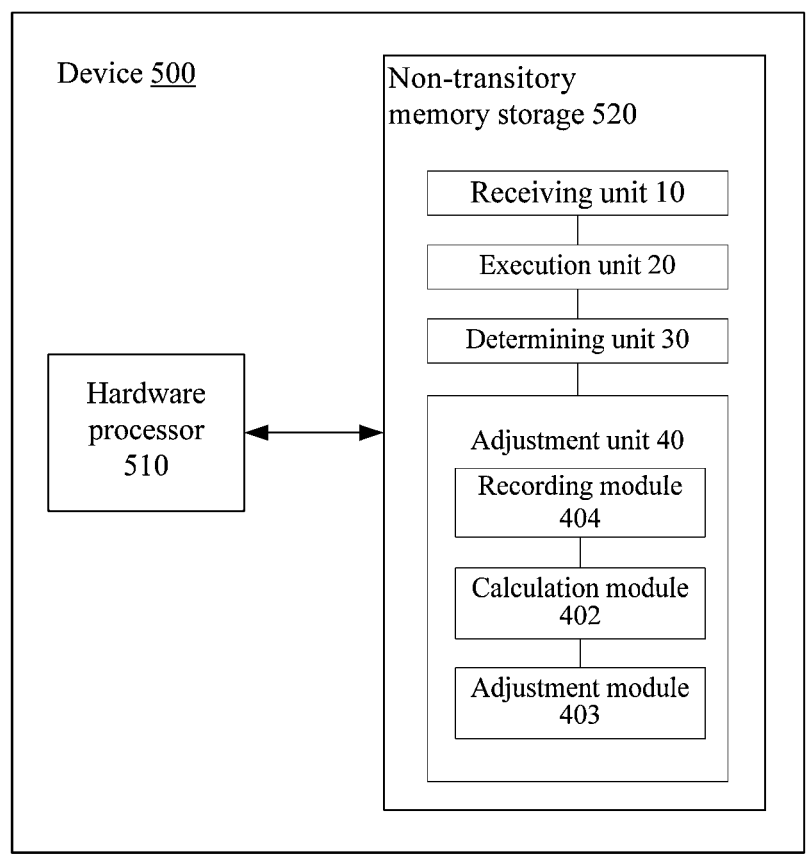
FIG. 7 shows the data processing device used for network application according to embodiments of the present disclosure.

FIG. 7 shows the data processing device designed according to embodiments of the present disclosure. As shown in the figure, this data processing device includes a receiving unit 10, an execution unit 20, a determining unit 30, and an adjustment unit 40, wherein the adjustment unit 40 further includes a calculation module 402, an adjustment module 403 and a recording module 404.

The receiving unit 10 is configured to receive the network application participating operation of the network application subject. The network application participating operation may have different operation forms in various network application forms, but all the network application participating operations can trigger the start of the network application flow, and ask the network application system to start network application work. A wide variety of network application forms exist, for example, rolling network application at an evening party, "Big Wheel" network application in games, or "Egg Breaking" network application in games. All the network application forms require users to trigger the start of network application work, and the network application system receives users' signals for requiring network application at the same time.

The receiving unit 10 receives the user's network application participating operation and triggers the network application system to perform network application.

The execution unit 20 is configured to execute the network application based on the network application participating operation of the network application subject. After the receiving unit 10 receives the network application participating operation, the execution unit 20 starts the network application participating operation. Depending on the network application system, the number of times that the network application may be provided for users may be one or more. After receiving the network application participating operation of the user, the network application system automatically generates a random number in the range of 1 to 100, determines the network application participating result whose probability percentage covers the generated number, and determines the prize for the user.

The number of times of user network application may be determined by the settings of the network application system. In the second time of user network application, the obtaining probability of each network application participating result may be changed to make the network application more attractive to the user.

The determining unit 30 is configured to determine whether the network application subject wins the network application participating result draw. The system determines whether the random number generated after the user triggers the start of the network application participating operation falls in the probability percentage of a network application participating result. If the number fails in the probability percentage set by the network application system, the system will determine the corresponding network application participating result won by the user; otherwise the system will determine that the user fails to win any network application participating result in this round.

The adjustment unit 40 is configured to adjust the obtaining probabilities of remaining application participating results corresponding to the network application subject. After learning that the user wins the network application participating result, the network application system deducts the corresponding probability of the network application participating result won this time, and adjusts the obtaining probabilities of the remaining application participating results. To control the quantities of released common props and ultimate props in the aforesaid example, the obtaining probabilities of the remaining application participating results may be adjusted according to the set basic obtaining probability.

The adjustment unit 40 includes a recording module 404, a calculation module 402, and an adjustment module 403.

The recording module 404 is configured to record network application times of the network application subject. The system records the number of rounds of network application and the serial number of won network application participating result for the network application subject in the record table, and stores this table in the database. Each network application subject corresponds to one record throughout the network application activity, and the network application subject may be a player.

When the player participates in the network application next time, the network application system will calculate the obtaining probability of each network application participating result according to the number of rounds of the network application and the won network application participating result in this player's network application record.

The calculation module 402 is configured to calculate the obtaining probabilities of remaining application participating results corresponding to the network application times according to the corresponding relationship between the pre-stored network application times of the network application subject and the obtaining probabilities of remaining application participating results. Each time the player wins a network application participating result draw, the probability value of the network application prize will be apportioned among the remaining network application participating results according to their respective proportions to 100%. For example, the original basic probability value of the ultimate prop is 5%, and it will get a percentage value of 0.25% from prop 1 by its probability of 5% after prop 1 is won in the first round; when the player participates in the second round of network application, the percentage value of the ultimate prop is 5.25%, and the probability percentage of the won prop is added to the remaining prop with the largest probability in the next round. The cardinal number of the prize pool is restored to 100% again, and the probability increase level of the ultimate prop is not high due to restriction of the basic probability value (5%). The overall probability percentage of each prop in all the prizes set will not change too much.

The adjustment module 403 is configured to adjust the obtaining probabilities of remaining application participating results corresponding to the network application subject according to the calculated obtaining probabilities of remaining application participating results.

Since each network application subject has different numbers of times of network application, so each network application subject will have different obtaining probabilities in each time. As a result, when calculating the obtaining probabilities of the remaining application participating results corresponding to each network application subject at the current time, the system needs to calculate the obtaining probabilities of currently remaining application participating results corresponding to the network application subject according to the current round of user network application and the won network application participating results stored in the database.

The embodiments of the present disclosure also provide a computer storage medium. This computer storage medium can store a program, which is configured to execute part or all of the steps in the aforesaid data processing method used for network application.

It should be noted that the embodiment of each aforesaid method is presented as a series of action combinations for the sake of easy description. However, technicians in the field should know that the present disclosure is not restricted by the sequence of described actions, because some steps may be completed in other sequences or simultaneously according to the present disclosure. Furthermore, technicians in the field should also know that all the embodiments described in the Specification are preferred embodiments, and some involved actions and modules may not be required for the present disclosure.

The above description of each embodiment places particular emphasis on different aspects. For the part not detailed in an embodiment, the related description may be found in another embodiment.

It should be understood that the devices disclosed in the embodiments provided by the application may be implemented in other ways. For example, the device embodiments described above are just exemplary, for example, definition of described units is only a definition of logical functions, and they may be defined in other modes in the actual implementation; a plurality of units or components may be combined or integrated in another system, or some features may be ignored or may not be executed. In addition, the mutual coupling or direct coupling or communication connection displayed or discussed may be indirect coupling or communication connection through some interfaces, devices, or units, or in the electrical or other forms.

The units described as separate parts may be or may not be physically separated, and parts displayed as units may be or may not be physical units, namely, they may be located at the same place or distributed on multiple network units. Some or all of the units may be selected as actually required to achieve the objectives of the present embodiment solution.

Besides, the functional units in each embodiment of the present disclosure may be integrated in one processing unit or physically exist as each independent unit, or two or more units may be integrated in one unit. The above integrated units may be implemented in the form of hardware or the form of software function unit.

If the integrated unit is implemented in the form of software function unit and marketed or used as an independent product, it may be stored in a computer readable storage medium. Based on such an understanding, essentially the whole technical solution of the present disclosure, or a part of the technical solution, or a part making a contribution to existing technologies may be embodied in the form of a software product. This computer software product is stored in a storage medium and includes a certain number of instructions so that a computer device (such as a PC, a server, or network equipment) can execute all or part of the steps in the method described in each embodiment of the present disclosure. The storage medium may include a non-transitory storage medium and/or transitory storage medium. Aforesaid storage medium may be any type of medium that can store program codes, such as U disk, Read-Only Memory (ROM), Random Access Memory (RAM), mobile hard drive, magnetic disk, or CD-ROM.

Only the preferred embodiments of the present disclosure are described above, and they are not intended to limit the present disclosure. For technicians in the field, the present disclosure may be altered or changed in various ways. Any modifications, equivalent substitutions and improvements without departing from the spirit and principle of the present disclosure fall within the protection scope of the present disclosure.

What is claimed is:

1. A data processing method, comprising:

receiving, by a processor, from a first remote device, a first network application participating operation created by a network application subject;

executing, by the processor, a network application participation action based on the network application participating operation;

determining, by the processor, the network application participation action causes the network application subject to win a first network application participating result draw and that the first remote device receives a first network application participating result included among a plurality of network application participating results;

adjusting, by the processor, stored probabilities corresponding to a remainder of the network application participating results, wherein adjustment of the stored probabilities corresponding to the remainder of the application participating results comprises:

recording, in a database, a number of times the network application is accessed by the network application subject, calculating a plurality of adjusted probabilities corresponding to the remainder of the application participating results based on a relationship between the number of times the network application is accessed by the network application subject and the stored probabilities corresponding to the remainder of the application participating results, and updating, in the database, the stored probabilities corresponding to the remainder of the application participating results based on the adjusted probabilities corresponding to the remainder of the application participating results;

transmitting, by the processor, the network application participating result to the first remote device;

receiving, by a processor, a second network application participating operation created by a second network application subject associated with a second remote device; and in response to receipt of the second network application participating operation, controlling, by the processor, based on a second network application participating result draw and the updated probabilities, transmission of a second network application participating result to the second remote device, the second network application participating result included among the remainder of the network application participating results.

2. The data processing method according to claim 1, wherein calculating the adjusted probabilities corresponding to the remainder of the application participating results comprises:

acquiring a stored probability corresponding to the first network application participating result; and calculating a first total sum comprising a combination of the stored probability corresponding to the first network application participating result and the stored probabilities corresponding to the remainder of the application participating results-, wherein the first total sum is equal to a second total sum of the adjusted probabilities.

3. The data processing method according to claim 1 wherein calculating the adjusted probabilities corresponding to the remainder of the application participating results further comprises:

apportioning a stored probability corresponding to the first network application participating result among the stored probabilities corresponding to the remainder of the application participating results.

4. The data processing method according to claim 3, wherein the stored probability corresponding to the first network application participating result and the stored probabilities corresponding to the remainder of the application participating results satisfy a formula comprising $$(K+K*T)+(J+J*T+T*T)+(P+P*T)+ \ldots +(n+n*T)=100\%,$$

wherein T is the stored probability corresponding to the application participating result, K is a probability of the first network application participating result out of remaining network application participating results, J is a probability of the network second network participating result out of the remaining network application participating results, P is a probability of a third network application participating result out of the remaining network application participating results, and n is a probability of network application participating result n out of the remaining network application participating results.

5. A data processing device comprising:
circuitry configured to receive, from a first remote device, a network application participating operation created by a network application;
circuitry configured to execute a participation action of the network application based on the first network application participating operation;
circuitry configured to determine the network participation action wins a network application participating result draw for a user of the network application;
circuitry configured to transmit the a network application participating result to the first remote device, the network application participating result included among a plurality of application participating results;
circuitry configured to record, in a database, a number of times the network application is accessed;
circuitry configured to calculate a plurality of adjusted probabilities corresponding to a remainder of the application participating results, wherein the adjusted probabilities are based on a relationship between the number of times the network application is accessed and stored probabilities corresponding to the remaining application participating results;
circuitry configured to adjust, in the database, the stored probabilities of obtaining the remaining application participating results based on the adjusted probabilities corresponding to the remaining application participating results, the remaining application participating results including a second network application participating result;
circuitry configured to receive, from a second remote device, a second network application participating operation; and
circuitry configured to control, in response to receipt of the second network application participating operation, based on the stored probabilities of obtaining the remaining application participating results, transmission of the second network application participating result to the second remote device.

6. The data processing device according to claim 5, wherein the circuitry configured to calculate a plurality of adjusted probabilities corresponding to the remaining application participating results further comprises:
circuitry configured to acquire a stored probability corresponding to the first network application participating result;
circuitry configured to determine the adjusted probabilities corresponding to the remaining application participating result, wherein a first total sum of the stored probability corresponding to the first network application participating result and the stored probabilities corresponding to the remaining application participating results is equal to
a second total sum of the adjusted probabilities corresponding to the remaining application participating results.

7. The data processing device according to claim 5, wherein the circuity configured to calculate the adjusted probabilities corresponding to the remaining application participating results further comprises:
circuitry configured to apportion a stored probability corresponding to the first network application participating result among the stored probabilities corresponding to the remaining application participating results.

8. The data processing device according to claim 7, wherein the stored probability corresponding to the obtained application participating result and the stored probabilities corresponding to the remaining application participating results are applied to a formula comprising $$(K+K*T)+(J+J*T+T*T)+(P+P*T)++(n+n*T)=100\%,$$

wherein T is the stored probability corresponding to the obtained application participating result, K indicates a probability of the first network application participating result in remaining network application participating results, J indicates a probability of the second network participating result in the remaining network application participating results, P indicates a probability of a third network application participating result in the remaining network application participating results, and n indicates a probability of network application participating result n in the remaining network application participating results.

9. A data processing device comprising:
a processor and a non-transitory storage medium accessible to the processor, the non-transitory storage medium storing a plurality of instructions that cause the processor to:
receive, from a first remote device, a first network application participating operation for a network application;
execute a participation action of the network application based on the first network application participating operation;
determine a network application subject of the network application wins a first network application participating result that is included in a plurality of network application participating results;
in response to determination that the network application subject of the network application wins the network application participating result:
record a number of times the network application is accessed,
calculate a plurality of adjusted probabilities corresponding to remaining application participating results of the network application participating results, wherein the adjusted probabilities are based on a relationship between the number of times the network application is accessed and stored probabilities corresponding to the remaining application participating results, adjust the stored probabilities of obtaining the remaining application participating results based on the adjusted probabilities corresponding to the remaining application participating results, and transmit the a network application participating result to the first remote device, the network application participating result included among a plurality of application participating results;

receive, from a second remote device, a second network application participating operation; and in response to receipt of the second network application participating action, control, based on the stored probabilities of obtaining the remaining application participating results, transmission of a second network application participating result to the second remote device, the second network application participating result included among the remaining application participating results.

10. The data processing device according to claim 9, wherein to calculate a plurality of adjusted probabilities corresponding to remaining application participating results, the instructions further cause the processor to:

acquire a stored probability corresponding to the first network application participating result won by the network application subject;

determine the adjusted probabilities corresponding to the remaining application results, wherein a first total sum of the stored probability corresponding to the first network application participating result and the stored probabilities corresponding to the remaining application participating results is equal to a second total sum of the adjusted probabilities corresponding to the remaining application participating results.

11. The data processing device according to claim 9, a sum of the stored probability corresponding to the first network application participating result won by the network application subject of the network application and the stored probabilities corresponding to the remaining application participating results is 100%, wherein the instructions further cause the processor to apportion the stored probability corresponding to the first network application participating result among the stored probabilities corresponding the remaining application participating results.

12. The data processing device according to claim 11, wherein the stored probability corresponding to the first network application participating result and the stored probabilities corresponding to the remaining application participating results satisfy the following formula:

$$(K+K*T)+(J+J*T+T*T)+(P+P*T)+\ldots+(n+n*T)=100\%$$

wherein T is the stored probability corresponding to the first network application participating result, K indicates a probability of the first network application participating result in the remaining network application participating results, J indicates a probability of the second network participating result in the remaining network application participating results, P indicates a probability of a third network application participating result in the remaining network application participating results, and n indicates a probability of network application participating result n in the remaining network application participating results.

\* \* \* \* \*